(12) United States Patent
Shami

(10) Patent No.: US 9,566,912 B2
(45) Date of Patent: Feb. 14, 2017

(54) AUTOMATIC CLOSING ARRANGEMENT FOR VEHICLE STOWAGE COMPARTMENTS

(71) Applicant: Ford Global Technologies, LLC, Dearborn, MI (US)

(72) Inventor: Salman Nazir Shami, Doreen (AU)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/301,396

(22) Filed: Jun. 11, 2014

(65) Prior Publication Data

US 2015/0360616 A1    Dec. 17, 2015

(51) Int. Cl.
*B60R 7/06* (2006.01)
*E05F 1/10* (2006.01)
*E05F 15/79* (2015.01)

(52) U.S. Cl.
CPC . *B60R 7/06* (2013.01); *E05F 1/10* (2013.01); *E05F 15/79* (2015.01)

(58) Field of Classification Search
CPC .............. B60R 7/06; E05B 83/30; E05F 1/10; E05F 15/79
See application file for complete search history.

(56) References Cited

U.S. PATENT DOCUMENTS

| | | | |
|---|---|---|---|
| 4,761,645 A | 8/1988 | Mochida | |
| 5,062,559 A * | 11/1991 | Falcoff | 224/311 |
| 5,275,249 A * | 1/1994 | Nelson | B62D 25/12 180/68.1 |
| 5,881,497 A * | 3/1999 | Borgardt | 49/139 |
| 7,121,605 B2 * | 10/2006 | DePue | E05B 83/30 296/37.12 |
| 7,500,704 B2 * | 3/2009 | Herrera et al. | 296/37.12 |
| 8,215,684 B2 | 7/2012 | Whitens et al. | |
| 2013/0158745 A1 | 6/2013 | Schneider et al. | |

OTHER PUBLICATIONS

M.H. Rhodes, Timing Mechanism, www.mhrhodes.com, 2 pages.

* cited by examiner

*Primary Examiner* — Glenn Dayoan
*Assistant Examiner* — Melissa A Black
(74) *Attorney, Agent, or Firm* — Vichit Chea; Price Heneveld LLP

(57) ABSTRACT

A vehicle stowage assembly including a storage compartment defining an opening to permit access to the compartment. A door is movably mounted proximate the opening. An actuator is operably connected to the door to move the door from an open position to a closed position. After the door has been opened, the actuator automatically closes the door after a predefined period of time has passed from the time at which the door was opened. The stowage assembly may include a mechanical timer or an electronic controller. The actuator may comprise a spring that biases the door towards the closed position, or the actuator may comprise an electric motor or other powered actuator. The assembly may include a sensor to prevent closure while in use and delay closing time.

11 Claims, 4 Drawing Sheets

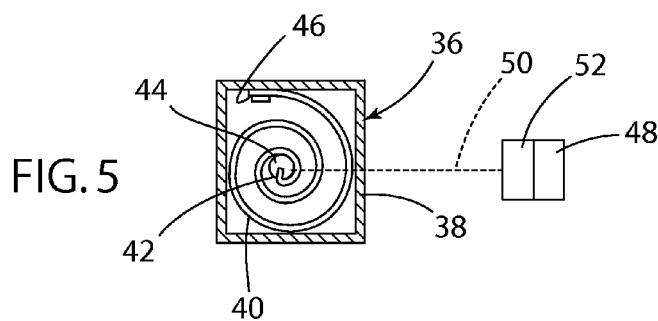
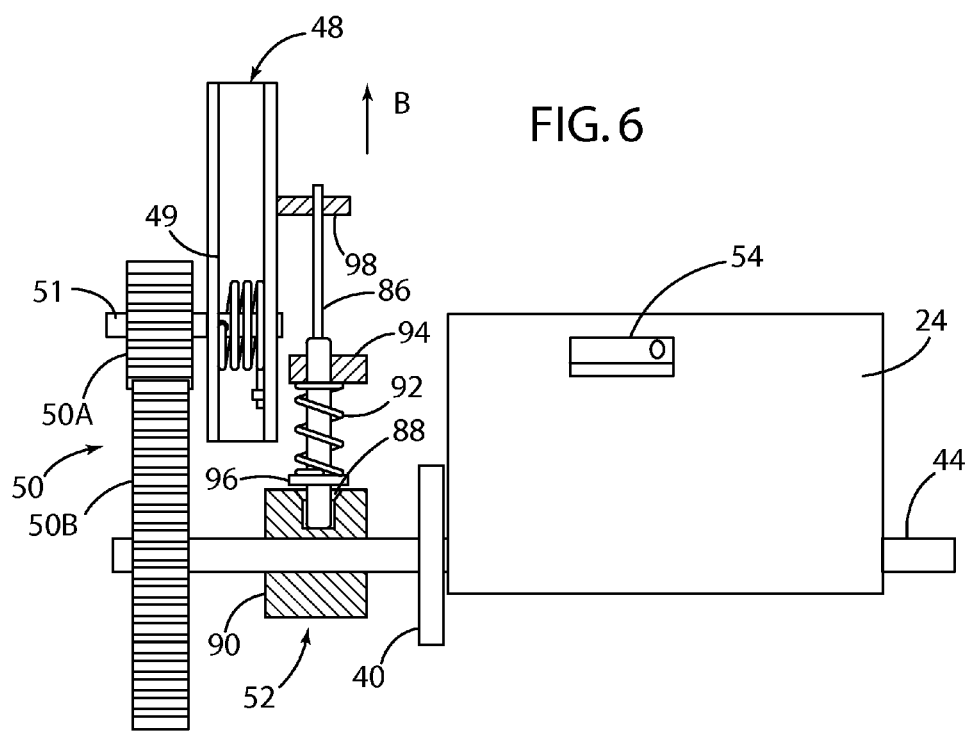

AUTOMATIC CLOSING ARRANGEMENT FOR VEHICLE STOWAGE COMPARTMENTS

FIELD OF THE INVENTION

The present invention generally relates to vehicle stowage compartments, and in particular to a storage compartment that closes automatically.

BACKGROUND OF THE INVENTION

Motor vehicles may include various stowage compartments such as glove boxes, sunglass holders, storage trays, or the like. Such stowage assemblies may be located in a vehicle interior, or, in some cases, a vehicle exterior. Such storage compartments may include a door that can be opened and closed by a user, and the door may include a lock to prevent unauthorized access to the storage compartment. However, known storage compartments may suffer from various drawbacks.

SUMMARY OF THE INVENTION

One aspect of the present invention is a vehicle stowage assembly including a storage compartment defining an opening to permit access to the compartment. A door is movably mounted to the compartment proximate the opening for movement between open and closed positions. An actuator is operably connected to the door to move the door from the open position to the closed position. After the door has been opened, the actuator automatically closes the door after a predefined period of time has passed from the opening of the door. The stowage assembly may include a mechanical timer or an electronic timer/controller. The actuator may comprise a mechanical device such as a spring that biases the door towards the closed position, or the actuator may comprise an electric motor or other suitable powered actuator. The door may include a lock that is automatically locked upon closing of the door, or upon locking of the main vehicle doors.

Another aspect of the present invention is a vehicle stowage assembly including a storage compartment and a door that selectively closes off an opening to the compartment. An electric motor is operably connected to the door, and a sensor is positioned adjacent the opening. A controller causes the electric motor to close the door after a predefined time from an event, wherein the event consists of either opening the door or detection of an object in the opening by the sensor.

Another aspect of the present invention is a vehicle stowage assembly including a storage compartment defining an opening to permit access to the compartment. A door is movably mounted to the compartment proximate the opening for movement between open and closed positions. A spring biases the door towards the closed position, and a releasable retaining device selectively retains the door in the open position. A timer is operably connected to the retaining device, and the timer releases the retaining device after a predefined time period from opening of the door such that the door moves from the open position to the closed position due to the bias of the spring.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a cross sectional view of a spring and timer mechanism;

FIG. 6 is a schematic view of a retaining mechanism and mechanical timer; and

DETAILED DESCRIPTION OF THE PREFERRED EMBODIMENTS

Figure 1:
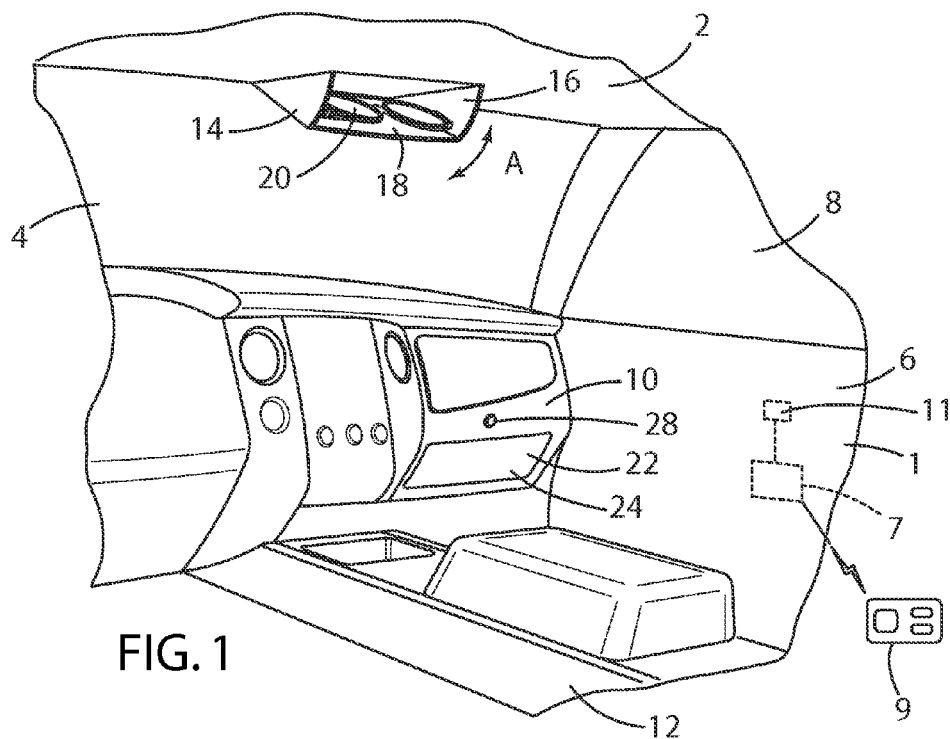
FIG. 1 is a partially fragmentary perspective view of a portion of a vehicle interior.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
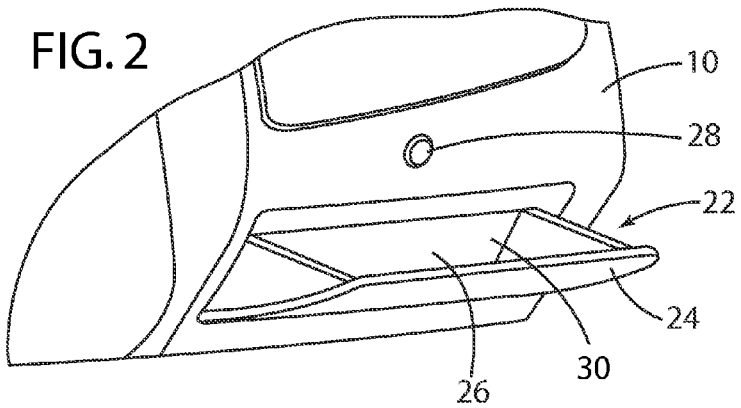
FIG. 2 is a partially fragmentary view of a glove box of the vehicle of FIG. 1.

With reference to FIG. 1, a vehicle 1 includes a roof structure 2, or in the case of a convertible, a front header above the windshield, a windshield 4, a plurality of doors 6 having glass 8, and a dash 10. Vehicle 1 may include a powered door lock system, and one or more of the doors 6 may include powered door lock mechanisms 7 that can be actuated by a remote fob 9 and/or interior switches 11 that communicate with an onboard controller (not shown). In the illustrated example, the vehicle 1 further includes a center console 12 and bin 14. Bin 14 is movably mounted to the roof structure 2 for upward and downward movement as indicated by the arrow "A" to provide access to interior 16 through opening 18 such that sunglasses 20 or other items can be stored in the interior space 16. Vehicle 1 also includes a glove box 22 having a door 24 (see also FIG. 2) that can be opened to provide access to interior space or compartment 26. As discussed in more detail below, the glove box 22 may include a lock 28 that selectively retains the door 24 in a closed position to prevent unauthorized access to the interior space or compartment 26 (FIG. 2) of glove box 22 through opening 30.

Figure 3:
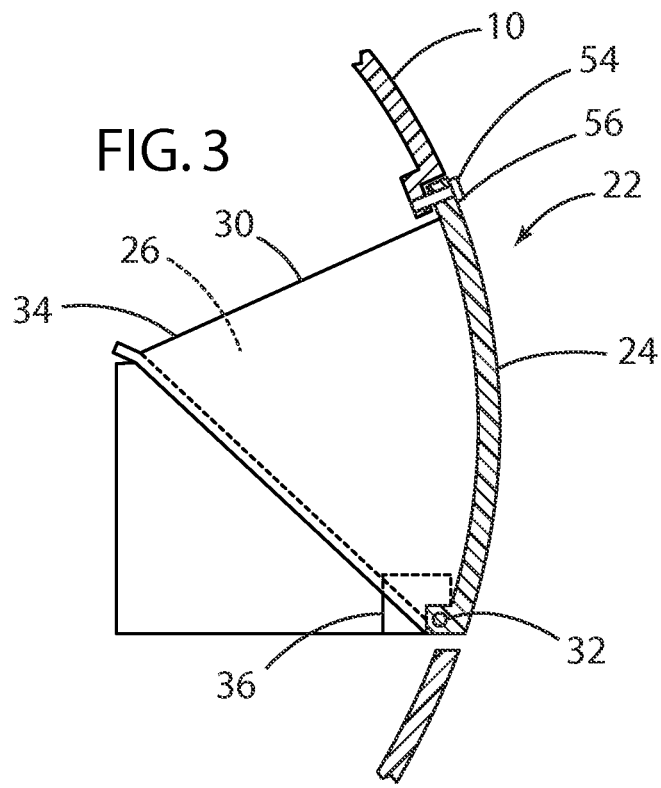
FIG. 3 is a partially fragmentary side elevational view of the glove box of FIG. 2 in a closed position.
Figure 4:
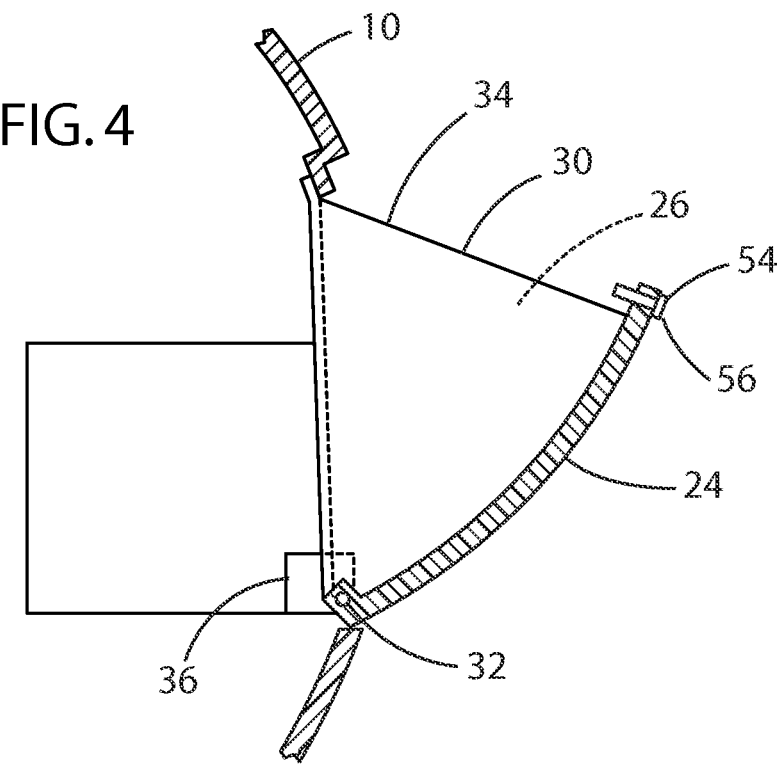
FIG. 4 is a partially fragmentary side elevational view of the glove box of FIG. 2 in an open position.

With further reference to FIGS. 3 and 4, the door 24 of glove box 22 can be moved from a closed position (FIG. 3) to an open position (FIG. 4) to permit access to the interior space or compartment 26 through upwardly facing opening 30 of glove box 22. It will be understood that opening 30 may face in virtually any direction as may be required for a particular compartment configuration. The door 24 may be movably mounted to the passenger side of dash structure 10 by a pin or hinge 32 that provides for pivoting of door 24. In the illustrated example, the door 24 includes a bin structure 34 that moves outwardly with the door 24, and wherein the interior space or compartment 26 is formed by the bin structure 34. However, it will be understood that the interior space or compartment 26 may be formed by a bin structure that is fixed to the dash 10 or other vehicle structure, such that the interior space or compartment 26 does not move upon movement of door 24.

A spring device 36 biases the door 24 from the open position (FIG. 4) towards the closed position (FIG. 3). With further reference to FIG. 5, the spring mechanism 36 may comprise a housing 38 that mounts to the dash structure 10, and a resilient member such as torsion spring 40 having a first end 42 that is connected to a shaft 44, and a second end 46 that is secured to housing 38. Shaft 44 may be fixed to door 24, such that rotation of door 24 causes shaft 44 to rotate and further stretch/tension torsion spring 40. The torsion spring 40 thereby biases the door 24 towards the closed position (FIG. 3). A mechanical timer 48 (FIGS. 5 and 6) is operably connected to the shaft 44 by a gear set 50 including gears 50A and 50B. Opening of door 24 winds a spring 49 (FIG. 6) on a shaft 51 in the mechanical timer 48. Mechanical timer 48 may comprise a conventional device such as a Marktime 19 series Spring Driven Timing Mechanism sold by MH Rhodes Cramer. The mechanical timer 48 includes a releasable retaining mechanism 52 that selectively retains the shaft 44 and prevents rotation of shaft 44 when the door 24 is in an open position. Releasable retaining mechanism 52 is triggered when shaft 44 rotates to an angle corresponding with door 24 at its full downward (open) position. Triggering of the releasable retaining mechanism 52 starts the countdown of timer 48.

Referring again to FIG. 6, retaining mechanism 52 may comprise a retaining member such as plunger 86 that is biased by a spring 92 into engagement with a hold or cavity 88 in a collar 90 that is fixed to shaft 44. Spring 92 may comprise a coil spring that is disposed between a fixed member 94 that is secured to a stationary dash structure and a washer 96 that is fixed to plunger 86. Timer 48 includes an output member such as lever 98 that is operably connected to plunger 86. Plunger 86 engages cavity 88 to prevent rotation of shaft 44 when door 24 is in an open position. As discussed above, opening of door 24 winds spring 49 of timer 48. After a predefined period of time, output lever 98 of timer 48 shifts in the direction of arrow "B" to thereby pull plunger 86 out of engagement with cavity 88 of shaft 44, thereby permitting rotation of shaft 44. The bias of spring 40 then causes door 24 to return to the closed position, and latch mechanism 54 latches to retain door 24 in the closed position. It will be understood that the present invention is not limited to the specific mechanical timer 48 and retaining mechanism 52 of FIGS. 5 and 6. Virtually any suitable mechanical timer and retaining mechanism could be used in accordance with the present invention.

In use, a user pulls the door 24 from the closed position (FIG. 3) to the open position (FIG. 4), thereby winding/tensioning the spring 40. As discussed above, the mechanical timer 48 may include a timer spring 49 that is wound (tensioned) as the door 24 is moved from the closed position to the open position to thereby transfer energy into the timer spring 49 of mechanical timer 48 where it is stored by the timer spring 49. The timer spring 49 thereby provides power to operate the timer 48. The timer spring 49 may comprise a torsion spring of a known configuration that is wound up as door 24 is opened. When the door 24 reaches the open position, the retaining mechanism 52 prevents rotation of the shaft 44 to thereby retain the door 24 in the open position. Also, the timer 48 is initially set when the door 24 reaches the open position. After a predefined period of time (e.g. 30 seconds, 60 seconds, or 2 minutes), the timer 48 causes the retaining mechanism 52 to release the shaft 44, and the torsion spring 40 then causes the door 24 to rotate from the open position 4 back to the closed position (FIG. 3). The door 24 may include a latch mechanism 54 that automatically latches when the door 24 reaches the closed position. The latch mechanism 54 may include a release button 56 or the like that can be actuated by a user to unlatch the latch 54 to permit the door 24 to be opened.

Thus, the door 24 of glove compartment 22 of FIGS. 3 and 4 is automatically returned to the closed position after a predefined period of time has passed from when the door 24 is opened. It will be understood that the glove box 22 is an example of a storage compartment according to one aspect of the present invention. However, the spring mechanism 36 and timer 48 may be utilized in connection with other vehicle storage compartments such as overhead bin 14 (FIG. 1) or other interior or exterior vehicle storage compartments.

Figure 7:
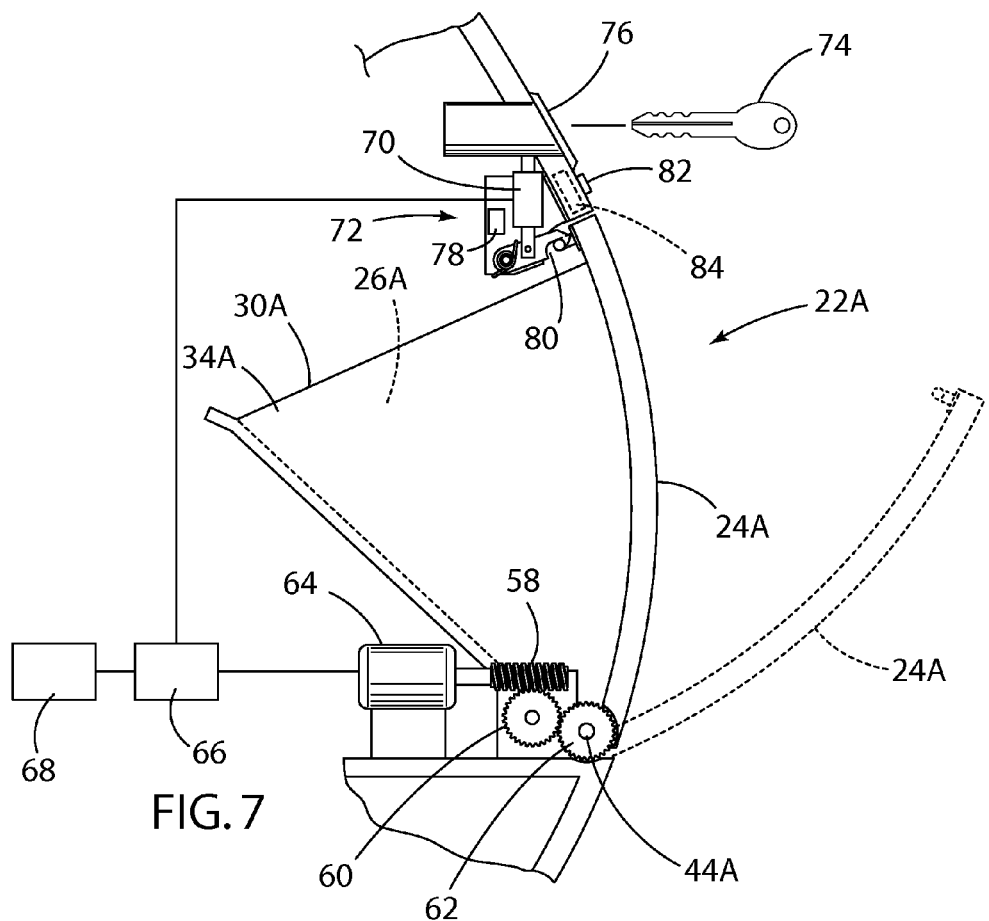
FIG. 7 is a partially schematic side elevational view of a glove box according to another aspect of the present invention.

With further reference to FIG. 7, a storage compartment according to another aspect of the present invention includes a glove box 22A having a door 24A that can be moved between opened and closed positions. The glove box 22A includes an interior space or compartment 26A that can be accessed through an opening 30A of a bin structure 34A when door 24A is in an open position. The door 24A is fixed to a shaft 44A. A powered actuator such as an electric motor 64 is operably connected to shaft 44A to provide for powered closing of door 24A. Electric motor 64 may be operably connected to the shaft 44A by gears 58, 60, and 62 whereby the electric motor 64 can move the door 24A from the open position to the closed position. The electric motor 64 may also, optionally, be configured to move the door 24A from the closed position to the open position. The electric motor 64 is operably connected to a controller 66 and a power supply such as a battery 68. It will be understood that a solenoid or other powered actuator such as a stepper motor may also be utilized to provide for powered closing of door 24A.

The storage compartment 22A may also include a lock mechanism 72 that is configured to secure the door 24A in the closed position. Lock mechanism 72 may include a lock cylinder 76 that can be actuated by a key 74 to selectively lock or unlock the door 24A when it is in the closed position. The lock mechanism 72 may also include an electrically powered solenoid 70 that provides for powered locking and unlocking of the door 24A. A switch 78 may also be operably connected to the controller 66 to provide a signal indicating that the door 24A is in a closed position.

In use, a user unlocks the lock mechanism 72 (if the lock mechanism 72 is locked) utilizing key 74. Controller 66 may also be configured to receive a signal from the fob 9 (FIG. 1), such that the controller 66 can actuate solenoid 70 to unlock the lock mechanism 72 utilizing solenoid 70. It may also be configured to receive the unlock signal from other sources such as the onboard controller. After a user moves the door 24A to the open position, the controller 66 actuates electric motor 64 to close the door 24A after a predefined period of time has passed (e.g. 30 seconds, 60 seconds, 2 minutes, etc.) to drive the door 24A back to the closed position. Controller 66 may be configured to start the time interval when switch 78 generates a signal indicating that the door 24 has been opened. Alternatively, the door 22A may include a switch (not shown) that is actuated when the door 24A reaches the open position, and controller 66 may begin the time period when the door 24A reaches the fully opened position. Stowage compartment 22A may include a mechanical latch 80 that automatically latches when the door 24A is moved to the closed position. The latch 80 may be unlatched by a button 82 or the like. The door 22A may also be locked utilizing key 74 or as a result of a signal from controller 66 actuating the solenoid 70. In general, the door 22A may include only a latch mechanism 80, only a lock mechanism 72, or both a latch mechanism 80 and a lock mechanism 72.

Controller 66 may be configured to automatically lock the lock mechanism 72 when the door 24A is in a closed position, or the controller 66 may be configured to lock the lock mechanism 72 after a predefined time period has passed from closing of the door 22A. Furthermore, the controller 66 may be operably connected to the powered door locks 7 (FIG. 1) of the vehicle 1, such that the lock mechanism 72 is locked if the powered door locks 7 are locked as a result of actuation of interior switches 11 or remote fob 9.

The stowage compartment 22A may also include a capacitive sensor 84 that is configured to detect the presence of a user's hand or other object in or adjacent the opening 30A. The capacitive sensor 84 is operably connected to the controller 66, and the controller 66 may be configured such that controller 66 does not actuate electric motor 64 to close door 24A if sensor 84 detects the presence of a user's hand in or adjacent the opening 30A. Controller 66 may be configured such that detection of a user's hand by capacitive sensor 84 resets the timer to thereby delay closing of door 24A. For example, controller 66 may be configured to actuate electric motor 64 to close door 24A 60 seconds after the door 24A is opened, and to reset the 60 second time period from the time at which a user's hand is last detected by capacitive sensor 84.

The vehicle stowage assembly of the present invention ensures that the doors of glove boxes or other stowage compartments of a vehicle are not inadvertently left open. Furthermore, the present invention may include an automatic lock feature that ensures that glove boxes or other stowage compartments are always closed and locked when not in use.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle stowage assembly comprising:
a vehicle storage compartment defining an opening to permit access to the compartment;
a door movably mounted to the compartment proximate the opening for movement between open and closed positions;
a resilient member that is configured to generate a force acting on the door to move the door from the open position to the closed position;
a retaining mechanism that selectively retains the door in an open position; and
a mechanical timer that is set upon opening of the door; and wherein:
after the door has been opened, the mechanical timer releases the retaining mechanism after a predefined period of time such that a force generated by the resilient member moves the door from the open position to the closed position and automatically closes the door after the predefined period of time has passed from the time at which the door was opened.

2. The vehicle stowage assembly of claim 1, wherein:
the storage compartment comprises a glove box configured to be mounted in a passenger side dash of a motor vehicle, and wherein the door is configured to rotate outwardly to define an upwardly facing opening.

3. The vehicle stowage assembly of claim 1, wherein:
the storage compartment is configured to be mounted in an overhead position for storing sunglasses, and wherein the door is configured to move downwardly to define an opening to receive sunglasses.

4. The vehicle stowage assembly of claim 1, wherein:
the resilient member comprises a spring.

5. A vehicle stowage assembly comprising:
a storage compartment and a door selectively closing off an opening to the compartment;
an electric motor operably connected to the door;
a sensor; and
a controller that causes the electric motor not to close the door when an object is detected in the opening by the sensor and to close the door after a predefined time from detection of an object in the opening by the sensor.

6. The vehicle stowage assembly of claim 5, wherein:
the storage compartment comprises a glove box configured to be mounted in a passenger side dash of a motor vehicle, and wherein the door is configured to rotate outwardly to define an upwardly facing opening.

7. The vehicle stowage assembly of claim 5, including:
a powered lock mechanism that is configured to secure the door in a closed position.

8. The vehicle stowage assembly of claim 7, wherein:
the controller is configured to lock the lock mechanism after the door closes.

9. A vehicle stowage assembly comprising:
a storage compartment defining an opening to permit access to the compartment;
a door movably mounted to the compartment proximate the opening for movement between open and closed positions;
a spring biasing the door towards the closed position;
a releasable retaining device configured to selectively retain the door in the open position; and
a timer operably connected to the retaining device, wherein the timer releases the retaining device after a predefined time period from opening of the door such that the door moves from the open position to the closed position due to the bias of the spring.

10. The vehicle stowage assembly of claim 9, wherein:
the timer comprises a mechanical device that is operably connected to the door such that opening of the door transfers energy into the timer and causes the timer to start.

11. The vehicle stowage assembly of claim 10, wherein:
the timer includes a torsion spring that is wound up upon opening of the door.

\* \* \* \* \*